3,140,279
POST EXTRUSION CROSSLINKING OF POLYETHYLENE

Razmic S. Gregorian, Silver Spring, Md., and Richard A. Bafford, Delmont, Pa., assignors to W. R. Grace & Co., New York, N.Y., a corporation of Connecticut
No Drawing. Filed Aug. 3, 1961, Ser. No. 128,961
9 Claims. (Cl. 260—94.9)

This invention relates to crosslinking polyethylene and more particularly to a process of crosslinking polyethylene at temperatures below or near its melting point.

The prior art teaches various methods of crosslinking polyethylene to convert it to relatively insoluble, less thermoplastic polymer. One method involves electron bombardment of the polymer at temperatures below the melting point. See U.S. Patent 2,906,678. However, such a method is costly requiring the installation of high voltage equipment. Other methods are based primarily on incorporating a free radical liberating substance into the solid polymer followed by or concurrent with heating. Many free radical-liberating substances have been employed for this purpose including especially organic peroxides. See U.S. 2,826,570.

While it is well known that such organic peroxides when incorporated in an ethylene polymer can promote crosslinking thereof, the use of such peroxides entails several disadvantages. For example, at the incorporation temperature certain peroxides (e.g. benzoyl peroxide) decompose violently. Other peroxides (e.g. t-butyl hydroperoxide) require heating of the polymer to temperatures above its melting point in order to effect decomposition of the hydroperoxide and subsequent crosslinking. The exposure of the polymer, especially after it has undergone its final shaping operation, to prolonged heating periods above its melting point causes distortion of the fabricated article, thus decreasing its commercial acceptability.

Hence one object of the instant invention is to crosslink polyethylene at temperatures whereat distortion of the fabricated article is avoided.

A further object of the present invention is to provide novel crosslinking promoters capable of decomposing the operable crosslinking agents herein named at temperatures below or near the melting point of polyethylene in order to effect crosslinking thereat. These and other objects will become apparent from reading hereinafter.

Surprisingly it has now been found possible to crosslink polyethylene at temperatures below or near its melting point by admixing polyethylene with a minor amount of a crosslinking promoter consisting essentially of certain transition metal compounds which are soluble in polyethylene, fabricating the mixture into a desired shape by conventional means e.g. extrusion, molding, vacuum forming and the like at a temperature above the melting point of the polyethylene, soaking the shaped polyethylene mixture in a solution of an alkyl hydroperoxide at temperatures in the range 20–65° C. and thereafter in an oxygen free atmosphere curing the thus soaked polyethylene at a temperature in the range from 30° C. below its melting point up to 10° C. above the melting point of polyethylene.

The transition metals operable in the instant invention are members of the group consisting of manganese and cobalt. Any compound containing Mn or Co in a valence state less than 4 which is soluble in polyethylene is operable herein as a crosslinking promoter.

The term "compound containing Mn or Co which is soluble in polyethylene" includes such groups as salts of organic acids and organo metallic complexes. Such salts would include but are not limited to butyrates, octanates, stearates, naphthenes, resinates, tallates, and linoresinates. Examples of organo-metallic complexes containing Mn or Co which are operable include, but are not limited to, acetylacetonates, dimethyglyoximes, and benzoin oximes. Obviously, within the groups supra, compound containing greater organic portions therein have greater solubility in the polyethylene.

The purpose of adding the crosslinking promoter is to cause the hydroperoxides to decompose into free radical sources at low temperatures. This allows the polyethylene to be fabricated into a shaped article prior to a crosslinking step without subsequent distortion in the curing step. Prior to this invention, articles, which were fabricated and then subjected to crosslinking, became distorted due to being exposed to high temperatures above the melting point of the polymer necessary to decompose the crosslinking agent. In the operable temperature range for curing herein, the melt viscosity of the polymer is high enough to preclude distortion.

The amount of crosslinking promoter used in the present invention is dependent upon the specific crosslinking agent employed. However, the transition metal from the group consisting of Co and Mn should be present in an amount in the range 0.001 to 10% by weight based on the weight of the polyethylene composition. Amounts of transition metal from the group consisting of Co and Mn less than prescribed in the aforesaid range are operable but the time interval prior to crosslinking becomes too long. On the other hand amounts of Co or Mn in excess of the range are also undesirable as subsequent oxidative degradation is increased thereby.

The curing temperature within which the crosslinking promoters of the instant invention will decompose the hydroperoxide crosslinking agents at an operable rate to effect crosslinking is between 30° below the melting point up to 10° C. above the melting point of polyethylene. For low density polyethylene i.e. about 0.920 having a melting point in the range 90–110° C., an operable curing temperature is in the range 60–120° C. For high density polyethylene (0.94–0.97) having a melting point in the range 125–138° C. a curing temperature of 95 to 148° C. is operable.

Although it is not necessary, it is preferred that the steps of admixing the crosslinking promoter with polyethylene and the fabricating of the shaped article be performed in an oxygen free atmosphere to preclude oxidative degradation of the polymer.

It is critical that the curing step be performed in the absence of oxygen. If the curing step is carried out in the presence of air or free oxygen, oxidative degradation of the polymer predominates over crosslinking thus resulting in a degraded polymer.

The step of soaking the crosslinking promoter containing polyethylene in an alkyl hydroperoxide is performed at temperatures in the range of 20 to 65° C. depending upon the hydroperoxide employed. Any alkyl hydroperoxide capable of generating free radicals is operable in this invention. Examples of such alkyl hydroperoxides include but are not limited to tertiary butyl hydroperoxide, cumene hydroperoxide, paramenthane hydroperoxide, meta diisopropryl benzene hydroperoxide and 2,5-dimethyl hexane dihydroperoxide.

Additionally, it is preferred but not necessary, except where the hydroperoxide is a solid, to employ a solvent in the soaking step. The solvent used should be one which will swell the polymer thereby aiding the inclusion of the hydroperoxide therein and dissolve any solid hydroperoxide utilized. If the hydroperoxide is a liquid the polymer swelling step can be performed in a solvent prior to or concurrent with soaking the polymer in the hydroperoxide. Where the hydroperoxide is a solid the steps are necessarily performed simultaneously. Suitable solvents employed for swelling the polymer and dissolving the hydroperoxide include, but are not limited to, benzene, hexane, cyclohexane and carbon tetrachloride.

The following examples are set forth to illustrate but not limit this invention.

The melt indices in all examples were measured under the conditions specified in ASTMD 1238–52T.

In the examples herein, percent gel content was measured in a Soxhlet extractor by extracting a sample (approx. 0.5 g.) of cured polyethylene in a benzene solution containing 0.1% Ionol (i.e. 2,6-ditertiary-butyl-4-methyl-phenol). The thimbles containing the polyethylene sample were placed in the boiling benzene solution for 1 hour and then suspended in the refluxing vapor for 23 hours. The insoluble portion was considered as gel.

Herein the density of polyethylene was measured in a density gradient tube by the Bell Laboratories Proposed ASTMD method for the Measurement of Density of Solid Plastics by the Density Gradient Technique.

EXAMPLE 1

Five parts of cobalt stearate were blended on a commercial mill with 1000 parts of polyethylene (melting point 110° C.) in particle form having a density of 0.92 and a melt index of 2.6. The thus-blended polyethylene was shaped in an extruder having a die temperature of 176° C. and extruded therefrom as a 1½" wide tape. The tape was then immersed in a bath of commercial grate t-butyl hydroperoxide (50° C.) for 0.5 minute. The tape was removed from the bath and the excess hydroperoxide was allowed to drain off. The tape was then placed in an oven at 80° C. The oven was maintained under a nitrogen atmosphere to exclude oxygen, which reacts with the free radicals formed by the decomposition of the hydroperoxide. After 10 minutes, the tape was removed from the oven. Upon characterization the cured polyethylene tape had a melt index of 0.0.

EXAMPLE 2

35 g. of commercial polyethylene (melting point 110° C.) having a melt index of 2.6 and a density of 0.92 and 0.01 g. of cobalt stearate were admixed on a Brabender Plastograph under a nitrogen blanket at a temperature of 115° C. for 15 minutes. The mixture was removed from the Plastograph and pressed into two sheets of 6 and 12 mil thickness respectively on a Carver press at 10,000 pounds pressure at a temperature of 250° F. for 6 minutes. The sheets were immersed in a bath (20° C.) of a 1% solution of cumene hydroperoxide in benzene for 2 minutes.

After removal, the sheets were dipped in a water bath aerated with nitrogen and maintained at a temperature of 80° C. Nitrogen aeration is necessary during the curing step to insure the exclusion of oxygen which reacts with and uses up free radicals formed by the hydroperoxide decomposition. After 10 minutes the sheets were removed and characterized for gel content by refluxing in a 0.1% Ionol (i.e. 2,6-ditertiary-butyl-4-methyl phenol) in benzene solution for 24 hours as in Example 1. The 6 inch sheet had a gel content of 0.13% and the 12 mil sheet had a gel content of 0.35%.

EXAMPLE 3

The procedure of Example 2 was followed except that 0.02 g. of manganese stearate was substituted for the 0.01 g. of cobalt stearate. The cured 6 and 12 mil polyethylene sheets had a gel content in excess of 0.1%.

EXAMPLE 4

35 g. of commercial polyethylene (melting point 110° C.) having a melt index of 2.6 and a density of 0.920 and 0.03 g. of cobalt stearate were admixed as in Example 2. The mixture was pressed into sheets of varying thickness on a Carver press at 1000 pounds pressure at a temperature of 250° F. for 6 minutes. The thus pressed sheets were immersed in a bath of commercial grade hydroperoxide solutions for 1 minute at 25° C. and then cured in a water bath aerated with nitrogen at 80° C. After 10 minutes the sheets were removed from the bath and characterized for percent gel content. The results are given in Table I.

*Table I.—Percent Gel Content of Cured Polyethylene*

| Run Number | Polyethylene Sheet thickness (mils) | Hydroperoxide bath | Percent Gel Content [1] |
|---|---|---|---|
| 82-204-1 | 6 | Cumene hydroperoxide | 6.45 |
| 82-204-2 | 12 | ----do---- | 4.53 |
| 82-204-3 | 18 | ----do---- | 3.56 |
| 82-204-4 | 6 | Tertiary butyl hydroperoxide | 6.87 |
| 82-204-5 | 12 | ----do---- | 2.23 |
| 82-204-6 | 18 | ----do---- | 1.49 |
| 82-204-7 | 12 | 50% Cumene hydroperoxide, 50% Benzene | 6.87 |
| 82-204-9 [2] | 12 | None | 0.30 |

[1] Percent gel content measured as disclosed supra.
[2] Control run—Polyethylene-cobalt stearate composition of Example 4 untreated with a hydroperoxide crosslinking agent.

The crosslinked compositions of the instant invention may contain suitable fillers, pigments, or plasticizers without departing from the scope of the invention.

We claim:

1. The process of crosslinking polyethylene at a temperature near its melting point which comprises admixing polyethylene with a polyethylene soluble crosslinking promoter selected from the group consisting of organic acid salts of Mn and Co and complexes of Mn and Co with acetylacetonates, dimethyl glyoximes and benzoin oximes, contacting the polyethylene composition with a liquid alkyl hydroperoxide and thereafter in the absence of oxygen heating the polyethylene composition to a temperature within 30° below its melting point up to 10° C. above its melting point.

2. The process according to claim 1 wherein the amount of the transition metal is 0.001 to 1.0% of the weight of the polyethylene composition.

3. The process according to claim 1 wherein the alkyl hydroperoxide is a member of the group consisting of tertiary butyl hydroperoxide and cumene hydroperoxide.

4. The process of crosslinking fabricated polyethylene at temperatures near its melting point which comprises admixing polyethylene at a polyethylene soluble temperature above its melting point with a crosslinking promoter selected from the group consisting of organic acid salts of Mn and Co and complexes of Mn and Co with acetylacetonates, dimethyl glyoximes and benzoin oximes, subjecting the polyethylene composition to a fabricating operation, cooling said polyethylene composition to a temperature in the range 20 to 65° C., contacting the polyethylene composition with a liquid alkyl hydroperoxide and thereafter in the absence of oxygen heating said composition to a temperature within 30° C. below its melting point up to 10° above its melting point.

5. The process according to claim 4 wherein the amount of the transition metal is 0.001 to 1.0% of the weight of the polyethylene composition.

6. The process according to claim 4 wherein the alkyl hydroperoxide is a member of the group consisting of tertiary butyl hydroperoxide and cumene hydroperoxide.

7. The process of crosslinking polyethylene at a temperature near its melting point which comprises admixing said polyethylene at a temperature above its melting point with a crosslinking promoter selected from the group consisting of cobalt stearate and manganese stearate in an amount equal to about 0.01 to 0.5% by weight of said polyethylene, cooling said admixture to a temperature in the range 20 to 65° C., contacting the thus cooled admixture with a liquid alkyl hydroperoxide selected from the group consisting of tertiary butyl hydroperoxide and cumene hydroperoxide and thereafter in the absence of oxygen heating the admixture to a temperature within 30° below the melting point of said polyethylene up to 10° C. above the melting point of said polyethylene.

8. The process of crosslinking polyethylene at a temperature near its melting point which comprises admixing polyethylene with a polyethylene soluble crosslinking promoter selected from the group consisting of organic acid salts of Mn and Co and complexes of Mn and Co with acetylacetones, dimethyl glyoximes and benzoin oximes, immersing the polyethylene composition in a solvent to swell the polymer contacting swollen polymer with a liquid alkyl hydroperoxide and thereafter in the absence of oxygen heating the admixture to a temperature within 30° C. below the melting point of said polyethylene up to 10° C. above the melting point of said polyethylene.

9. The process of crosslinking fabricated polyethylene at temperatures near its melting point which comprises admixing polyethylene at a temperature above its melting point with a polyethylene soluble crosslinking promoter selected from the group consisting of organic acid salts of Mn and Co and complexes of Mn and Co with acetylacetonates, dimethyl glyoximes and benzoin oximes, subjecting the polyethylene composition to a fabricating operation, cooling said polyethylene composition to a temperature in the range 20 to 65° C. immersing the polyethylene composition in a solvent to swell the polymer contacting thus swelled polyethylene composition with a liquid alkyl hydroperoxide and thereafter in the absence of oxygen heating said composition to a temperature within 30° C. below its melting point up to 10° above its melting point.

References Cited in the file of this patent
UNITED STATES PATENTS 2,628,214     Pinkney et al. _____ Feb. 10, 1953

FOREIGN PATENTS 784,611     Great Britain _____ Oct. 9, 1957

OTHER REFERENCES

Industrial and Engineering Chemistry, vol. 47, No. 7, July 1955.

Chemistry of Organic Compounds (Noller), p. 889, published by W. B. Saunders Co., Philadelphia, Pa., 1957.